(12) United States Patent
Wiencke et al.

(10) Patent No.: US 9,047,140 B2
(45) Date of Patent: Jun. 2, 2015

(54) INDEPENDENTLY TIMED MULTIPLIER

(75) Inventors: Christian Wiencke, Garching (DE);
Horst Diewald, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 350 days.

(21) Appl. No.: 13/559,832

(22) Filed: Jul. 27, 2012

(65) Prior Publication Data

US 2013/0031154 A1   Jan. 31, 2013

(30) Foreign Application Priority Data

Jul. 27, 2011   (DE) .......................... 10 2011 108 576

(51) Int. Cl.
*G06F 7/523* (2006.01)
*G06F 7/53* (2006.01)

(52) U.S. Cl.
CPC .................................... *G06F 7/5312* (2013.01)

(58) Field of Classification Search
None
See application file for complete search history.

(56) References Cited

U.S. PATENT DOCUMENTS

| | | | | |
|---|---|---|---|---|
| 3,085,747 A | * | 4/1963 | Tilton ............................ | 708/627 |
| 5,698,996 A | * | 12/1997 | Ko .................................. | 326/93 |
| 5,740,094 A | * | 4/1998 | Klim ............................. | 708/620 |
| 5,982,314 A | * | 11/1999 | Amar et al. .................... | 341/143 |
| 6,651,079 B1 | * | 11/2003 | Nguyen et al. ................ | 708/627 |
| 2006/0242219 A1 | * | 10/2006 | Chen et al. .................... | 708/620 |
| 2008/0243976 A1 | * | 10/2008 | Wiencke ........................ | 708/230 |
| 2009/0132630 A1 | * | 5/2009 | Wiencke ........................ | 708/625 |
| 2013/0031154 A1 | * | 1/2013 | Wiencke et al. ............... | 708/629 |

FOREIGN PATENT DOCUMENTS

| | | |
|---|---|---|
| DE | 102007014808 A1 | 10/2008 |
| DE | 102007056104 A1 | 5/2009 |
| EP | 0703530 A2 | 3/1996 |

* cited by examiner

*Primary Examiner* — David H Malzahn
(74) *Attorney, Agent, or Firm* — Robert D. Marshall, Jr.; Frank D. Cimino

(57) ABSTRACT

An independently timed multiplier unit includes a multiplier and a clock generator. The multiplier has a first set of semiconductor circuits in a critical path. The clock generator has a second set of semiconductor circuits configured to control a clock period of said clock generator selected to set a clock period longer than the propagation delay through the critical path of the multiplier. The clock generator may include a delay circuit having a delay to set the clock period longer than the propagation delay through the critical path of said multiplier. The clock generator uses circuit with identical logical design including the same standard cells, the same logic design or the same floor plan. Close matching of these circuit causes the multiplier and the clock generator to experience the same PVT speed variations.

28 Claims, 11 Drawing Sheets

INDEPENDENTLY TIMED MULTIPLIER

CLAIM OF PRIORITY

This application claims priority under 35 U.S.C. 119(a) to German Patent Application No. 10 2011 108 576.2 filed Jul. 27, 2011.

TECHNICAL FIELD OF THE INVENTION

The technical field of this invention is an independently timed multiplier unit.

BACKGROUND OF THE INVENTION

A multiplier or multiplier may be realized using a parallel design to achieve good performance such as completing a multiplication operation in one or two cycles. Parallel multipliers need a large number of gates which increases production cost. A multiplier may be built using a serial design to reduce the gate count and cost. Serial multipliers are disclosed in German Patent Application Nos. 10 2007 014 808 and 10 2007 056 104. Multiplication is a basic and central data processing step in all kinds of data processing units and applications. There is a general motivation to improve multiplier units for faster operation and reduced complexity. Generally a tradeoff needs to be found between performance and cost.

A multiplier is typically a part of a microcontroller, microprocessor or other digital unit. The multiplier is typically clocked with the system or main processor clock. For both serial and parallel multipliers the critical signal path delay of the combinatorial logic within the multiplier must be shorter than the clock period of the system clock under the worst PVT conditions. In the commonly used term PVT refers to variances in operational rate based upon fluctuation in the production process, known as production spread (P), varying voltage (V) and varying temperature (T). The electronic characteristics and parameters of the devices will vary slightly from one device to another based upon these factors. The worst PVT conditions are a weak production process, a low operating voltage and a high operating temperature.

An electronic device is mostly not operated under these worst case PVT conditions. Thus the performance of the device is generally much higher than under these worst case PVT conditions. A multiplier may thus be implemented having its own clock independent of the system clock. The multiplier may run faster than the system clock and therefore even serial multiplication can be executed in one or two system clock cycles. Since the multiplier performance does not depend on the system clock frequency, the system can be clocked slower than a typical synchronous architecture while maintaining high multiplication performance. This may enable a significant reduction of the system level energy consumption.

The multiplier local clock may be adapted to the critical path delay of the multiplier. In a synchronous digital design with a fixed clock rate, the clock must always as fast as the critical path of the multiplier under worst case PVT conditions. The electronic circuit is generally not operated under these worst case conditions. An adaptive clock may enable the multiplier to be operated faster. This will increase the average performance of the multiplier. However, the multiplier must be as fast as the system requires the respective results from the multiplier. In other words, the local clock of the multiplier must be fast enough (under all PVT conditions) to provide appropriate service to the rest of the system. For example, the multiplier may need one system clock cycle for one multiplication under typical PVT conditions while it may require two system clock cycles under worst case PVT conditions. Thus the system clock speed or the clock frequency of the multiplier has to be adjusted to the current PVT conditions. This required a generally cost and time consuming calibration process which may be required of every device. This calibration compensates for the production spread (P). The voltage (V) and temperature (T) have to be measured during operation of the device in order to properly adjust the clock frequency.

SUMMARY OF THE INVENTION

This invention is a multiplier with improved performance under different environmental conditions.

In one aspect of the invention the multiplier is an independently timed multiplier. The multiplier has a carry save adder for multiplying a first and a second operand and at least one register storing at least parts of the product of the multiplication. The carry save adder has a plurality of rows, each comprising a plurality of AND gates calculating a single bit product. The carry save adder has a plurality of adder cells adding results of the preceding row to a following row. The carry save adder has a critical path for calculating the product. The critical path is the signal path through the multiply or carry save adder having the maximum signal propagation delay. The multiplier further has an oscillator clocking the at least one register. The oscillator has a clock period that is longer than the propagation delay of the critical path of the multiplier. At least some of the logical gates of the oscillator, the carry save adder and the at least one register are uniform. This uniformity may mean that the respective logical gates are manufactured using the same standard cell. This uniformity may mean that the logical gates have the same semiconductor layout.

The multiplier includes two adder stages including a carry save adder and a carry propagate adder. The carry propagate adder is coupled to the carry save adder and consists of a row of full adder cells adding the carry vector and the sum vector provided at the output row of the carry save adder.

In another advantageous embodiment, only a single carry save adder stage is used for all summing operations. After performing all additions relating to the partial products of a multiplication, the carry save adder performs the final addition by adding the carry vector and the sum vector at the output row of the carry save adder. This aspect of the invention recognizes that it can be useful to use hardware having the same critical path. This configuration allows the same clock period to be used for all summing operations. This permits the multiply to be continuously clocked with a clock having a constant clock period a little bit longer than the critical path delay of the carry save adder.

According to another aspect of the invention, the oscillator has at least one adder cell. The multiplier is configured to multiply a first operand and a second operand. The multiplier has plural adder cells configured as the carry save adder. The adder cells are arranged in rows and columns. Each row of adder cells is configured to add the product of a plurality of digits (single bits) of the first operand and a single bit of the second operand to the product of the digits of the first operand and another single bit of the second operand. The critical path of the multiply then passes through all rows of the multiplier such as through one adder cell of each row. The multiplier has a first number of rows. The oscillator advantageously has a second number of adder cells. The first number may be equal to twice the second number. The oscillator thus advantageously has half the number of adder cells as the number of rows in the multiplier. The oscillator has at least one storing element such as a flip-flop a latch. The oscillator is configured in a loop comprising the adder cell(s) and the at least one storing element. The oscillator produces the same edge of an output clock signal only after the signal has propagated twice through the adder cells of the loop.

Advantageously this multiplier has a small gate count and provides high performance. This multiplier has a high frequency clock having a clock period that is independent of the system clock. The independently timed clock period is adapted to the critical path of the multiplier unit. This independently timed multiplier provides low leakage power consumption and high average performance. The performance of the multiplier is significantly higher than worst case PVT conditions would allow for a synchronous design. Not only does this independently timed multiplier provide a better performance when compared to typical synchronous designs but its reduces system energy consumption.

The multiplier according to aspects of the invention is designed with the clock period of the oscillator slightly larger than the propagation delay of the critical path of the carry save adder. The clock period may be optimized so that it slightly exceeds the propagation delay of the critical path of the carry save adder.

This propagation delay of the critical path of the carry save adder will change with changing PVT conditions. Voltage (V) and temperature (T) conditions will change due to changing operating conditions for the respective electronic device comprising the multiplier unit. The voltage and temperature may vary due to a weak power supply or different places of operation.

Advantageously, no adaption of the independently timed oscillator is necessary. At least a part of the logical gates of the oscillator, the carry save adder and the at least one register are uniform with each other. Due to this uniformity, the operating characteristics of oscillator and the carry save adder and the register change in a similar way under varying PVT conditions. Preferably, the microstructure of the logical gates is similar due to the use of the same standard cell for the logical gates. Thus the environmental influences of voltage (V) and temperature (T) and variations in the production process (P) influence the operating parameters such as signal and delay times of the carry save adder, the register and the oscillator in a comparable way.

In another aspect of the invention, the oscillator has the same uniform adder cell as the carry save adder. Advantageously, the adder is a full adder. According to another advantageous aspect, the oscillator includes the same uniform flip-flop as the register. While slight deviations in the layout of the logical gates might be harmless with respect to their PVT time behavior, a full adder can significantly influence the time dependent behavior of the carry save adder. This also applies to the register with respect to its flip-flops. It is advantageous if these basic logical gates of the carry save adder and the register are comparable with respect to their PVT characteristics as the basic logical gates of the oscillator.

In order to increase the uniformity of the PVT time dependent behavior, it is advantageous to manufacture the uniform logical gates of the oscillator, the carry save adder and/or the at least one register using the same standard cell. Preferably, this standard cell is from a standard library. Advantageously, the uniform logical gates have not only the same standard cell but also the same semiconductor layout. Accordingly, the micro structure of the respective gates is nearly identical. This leads to a PVT behavior of the oscillator, the carry save adder and the register that is nearly identical.

In an aspect of the invention, the logical gates of the oscillator and the logical gates of the carry save adder are arranged in a floor plan of the independently timed multiplier. Thus the signal delay time within the critical path part of the carry save adder is shorter than the signal delay time between the logical gates of the oscillator. Advantageously, this signal delay time ensures that the clock period of the oscillator is longer than a signal delay time along the critical path of the carry save adder.

According to an embodiment of the invention, the logical gates of the oscillator are disposed at opposite sides with respect to the logical gates of the carry save adder. In this configuration, the conductive paths inside the oscillator are longer than the conductive paths inside the carry save adder. Consequently, the signal delay times inside the oscillator are higher when compared to the signal delay times inside the carry save adder. This ensures that the clock period of the oscillator is longer than the signal delay time along the critical path of the carry save adder.

According to another aspect of the invention, the oscillator has at least an XOR, a first flip-flop and a second flip-flop. In the floor plan of the independently timed multiplier, the first flip-flop and the second flip-flop are disposed at opposite sides with respect to the logical gates of the carry save adder. The XOR-gate has a center region that is intermediate to the position of the first flip-flop and the second flip-flop.

During a first cycle of the oscillator, while the output signal of the oscillator is high, the clock signal is routed from the first flip-flop to the XOR-gate. During a second cycle of the oscillator, while the output signal is low, the clock signal is routed from the second flip-flop to the XOR-gate. Because the XOR-gate is disposed in a center region that is intermediate to the position of the first flip-flop and the second flip-flop, the signal path delay for the clock signal that is routed from the first flip-flop to the XOR-gate is comparable to the signal path delay for the clock signal that is routed from the second flip-flop to the XOR-gate. Accordingly, the duty cycle of the clock signal is advantageously uniform.

According to an embodiment of the invention, the oscillator is dedicated to a carry save adder having two rows. The oscillator has a first and a second flip-flop, a full adder and an XOR-gate. The inverted output of each flip-flop is coupled to its respective data input, while the sum and carry outputs of the full adder are coupled to the clock input of the respective first and second flip-flop. The output of the first and second flip-flop is coupled to a respective input of the XOR-gate. The output of the XOR-gate is coupled to the carry input of the full adder. The output of the XOR-gate also serves as an output of the oscillator. Advantageously, the layout of the dedicated oscillator has a behavior with respect to variations of temperature, power supply and/or process parameters that is comparable to the behavior of the critical path of a carry save adder having two rows. This is because the signal path in the oscillator for producing one clock cycle (one clock period) and the critical path of the carry save adder comprise the same type and same number of logical gates.

According to further embodiments of the invention, the oscillator may be extended to a carry save adder having more than two rows. An oscillator for a carry save adder having 16 rows has 8 flip-flops coupled in the same way for the carry save adder having two rows.

According to another embodiment of the invention, the multiplier for the carry save adder has two rows. This multiplier has an oscillator further comprising an additional second full adder and a first and a second AND gate. The second full adder is coupled in parallel to the first full adder with respect to its carry input terminal. The sum output of the first and second full adder is coupled to respective terminals of the first AND-gate while the carry output of the first and second full adder is coupled to respective terminals of the second AND gate. The output of the first AND-gate is coupled to the clock input of the first flip-flop and the output of the second AND-gate is coupled to the clock input of the second flip-flop. The criterion that the clock period has to be slightly longer than the critical path of the carry save adder is advantageously achieved using the two full adders. Variations in the production process (P) will lead to different delay times within the full adder. When using two full adders in this way, the slower one will be the pacemaker.

According to another aspect, a dedicated oscillator for a multiplier has a carry save adder comprising two rows. The oscillator has a first and a second flip-flop, a full adder, a XOR-gate and an inverter, wherein the inverted output of each flip-flop is coupled to its respective data input. According to a first embodiment, the sum output of the full adder is coupled to the clock input of the first and second flip-flop. The sum output of the full adder that is coupled to the second flip-flop is coupled to an inverter and to the clock input of the second flip-flop. According to an alternative embodiment, the carry output of the full adder is coupled to the clock input of the first and second flip-flop. The carry output that is coupled to the first flip-flop is coupled to an inverter and to the clock input of the first flip-flop. In both embodiments the output of the first and second flip-flop is coupled to a respective input of the XOR-gate. The output of the XOR-gate is coupled to the carry input of the full adder. The output of the XOR-gate provides the clock output of the oscillator. Instead of using both the sum and carry outputs of the full adder, only one of them may be used. This is advantageous, if the respective delay times between the carry input and the sum output and the carry output are significantly different. The additional inverter has a delay time and thereby adds a further delay to the clock period.

In another embodiment of the invention, a dedicated oscillator for a multiplier has a carry save adder having four rows. The dedicated oscillator includes in addition to the oscillator of the two aforementioned embodiments a second full adder. This second full adder is coupled with its carry input to the output of the XOR-gate. The carry output of the second full adder to the carry input of the first full adder. The second full adder provides a suitable extra delay time that is necessary due to the additional two rows of the carry save adder. This is because the signal in the oscillator generating one clock period and the signal propagating through the critical path of the carry save adder have to pass through the same type and same number of logical gates.

According to another aspect of the invention a delay element is coupled between the output of the XOR-gate and the carry input of the full adder. This ensures that the clock period is slightly longer than the signal delay of the critical path of the carry save adder.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
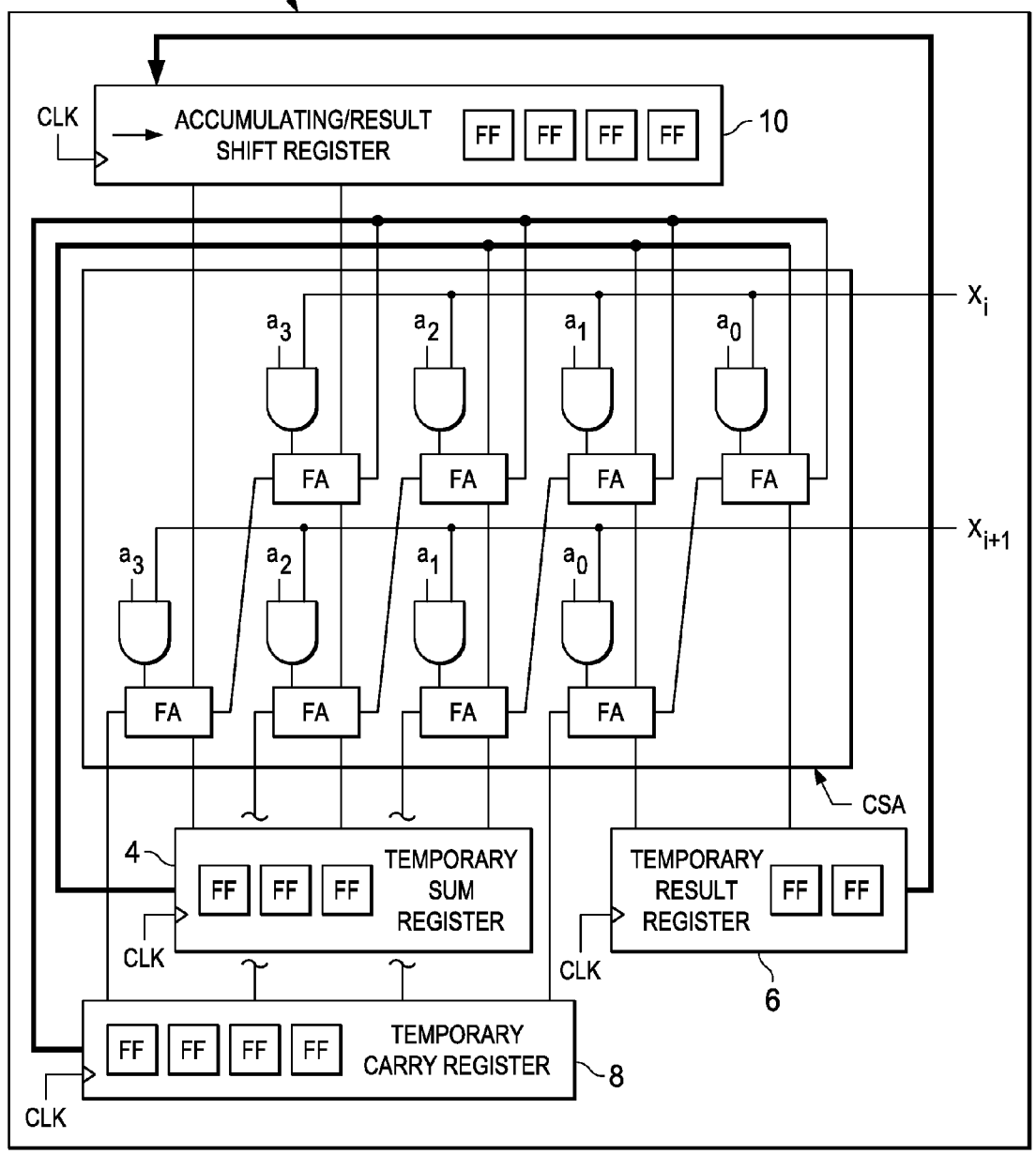
FIG. 1 is a simplified circuit diagram of a multiplier having a carry save adder having two rows.
Figure 7:
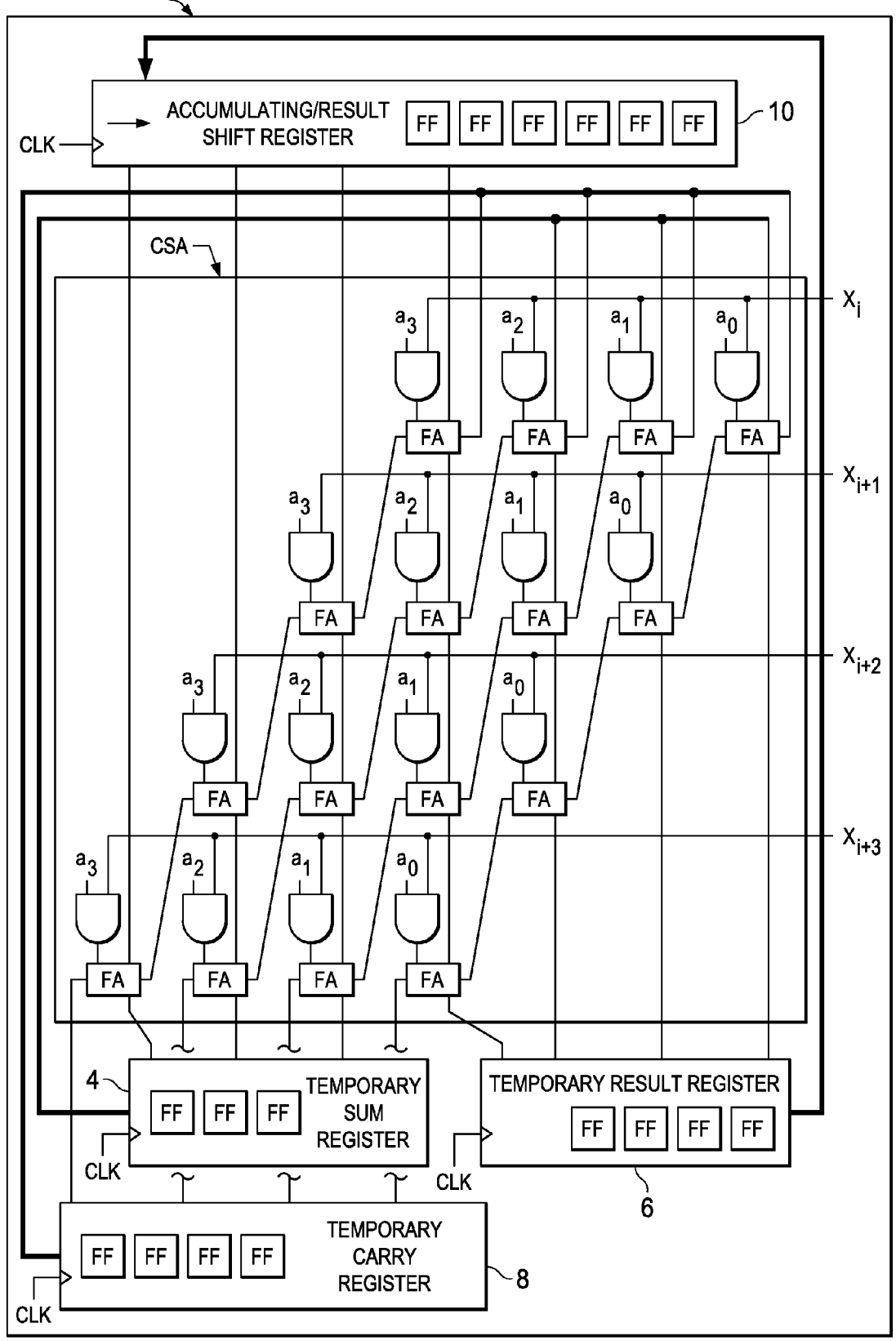
FIG. 7 is a simplified circuit diagram of a multiplier having a carry save adder having four rows.

FIG. 1 is a simplified circuit diagram of a multiplier 2 having a carry save adder CSA, a temporary sum register 4, a temporary result register 6, a temporary carry register 8 and an accumulating result shift register 10. Each register 4, 6, 8, 10 has a plurality of flip-flops FF. The carry save adder CSA has a plurality of full adders FA in two rows for two bits $X_i$ and $X_{i+1}$ of a second operand. A further carry save adder comprising four rows is shown in FIG. 7 will be described later. The two row carry save adder CSA in FIG. 1 and the four row carry save adder CSA in FIG. 7 are comparable in layout.

Consider the example of a first operand of 4 bit depth with bits $a_0$ to $a_3$. The bit values $a_0$ to $a_3$ are input to the respective AND-gates together with respective two bit values $X_i$ and $X_{i+1}$. The output of the AND-gates supply the A input of the full adders FA. The lower bit parts of the full adder FA sums are stored in temporary result register 6. The higher bit parts of the full adder FA sums are stored in temporary sum register 4. The carry values from the full adders FA of the last row of carry save adder CSA are stored in temporary carry register 8. To multiply operands having more than four bits, this operation of the carry save adder CSA is repeated iteratively. The accumulating result shift register 10 incorporates the lower bit results. This is indicated by the arrow pointing from the temporary result register 6 to the accumulating result shift register 10. Further details for the carry save adder CSA and its operation are exemplarily known from German Patent Application No. 10 2007 014 808 filed on Mar. 28, 2007 and German Patent Application No. 10 2007 056 104 filed on Nov. 15, 2007 by the same applicant.

According to an exemplary embodiment, the registers 4, 6, 8, 10 are clocked by clock signal CLK that is preferably generated by an oscillator according to an embodiment shown in one of FIGS. 2 to 4, 6 or 8. The respective oscillators are exemplarily dedicated to the two row type multiplier 2 shown in FIG. 1.

Figure 2:
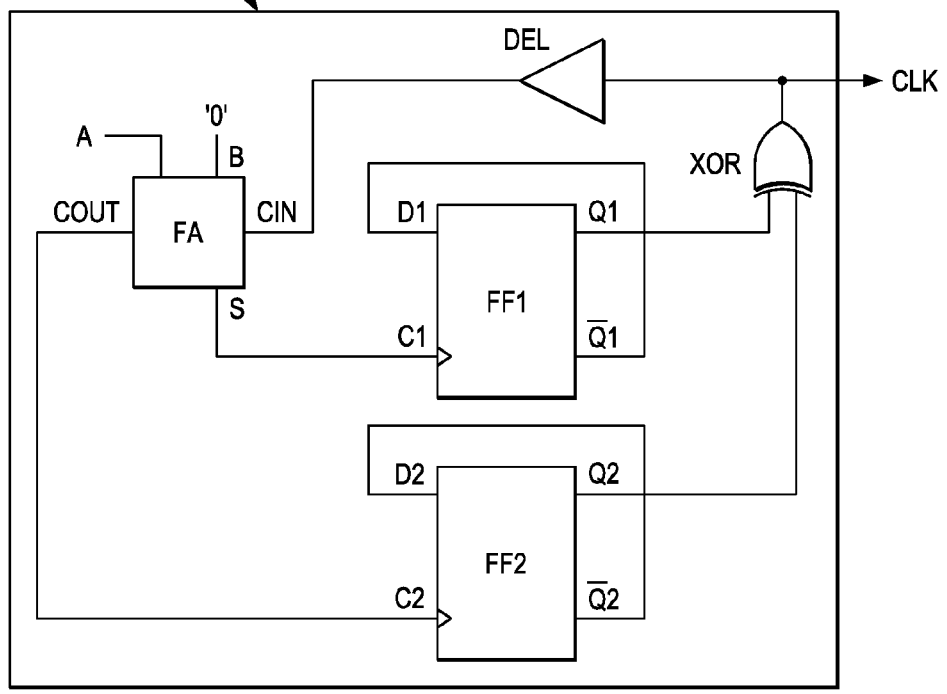
FIG. 2 is a simplified circuit diagram of an oscillator according to an embodiment of the invention.
Figure 3:
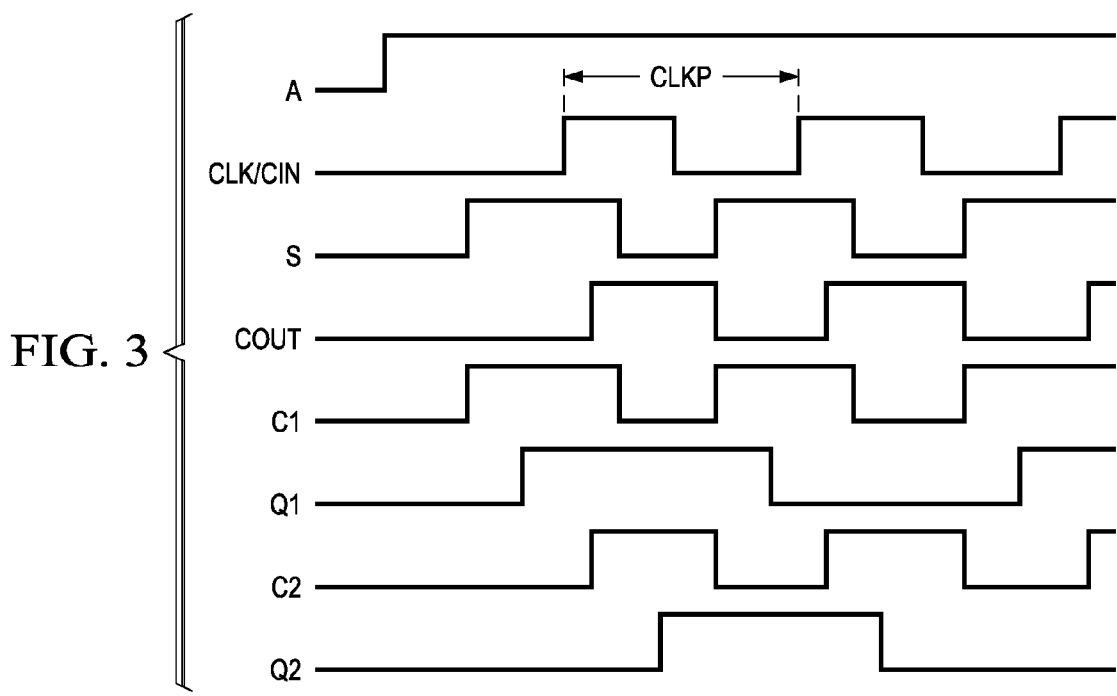
FIG. 3 is a diagram of signals inside the oscillator of the embodiment of FIG. 2.

FIG. 2 is an oscillator 12 comprising a full adder FA, a first flip-flop FF1, a second flip-flop FF2, an XOR-gate XOR and a delay element DEL. Oscillator 12 is enabled by setting input A of full adder FA to high. The second input B of full adder FA is constantly set to "0". FIG. 3 illustrates time dependent signals of selected terminals of the logic gates of the oscillator 12 illustrated in FIG. 2.

When switching input A of full adder FA from low to high a delay time $T_{FA-S}$ elapses before sum output S of full adder FA follows and also switches from low to high. Sum output S of full adder FA supplies input C1 of flip-flop FF1 which also changes from low to high. After expiration of a delay time $T_{FFQ}$, which is the clock to Q delay time of flip-flop FF1, output Q1 of flip-flop F1 switches to high. The inverted output of flip-flop FF1 $\overline{Q1}$ is coupled to data input D1 of flip-flop FF1. Output Q1 is coupled to one terminal of XOR-gate XOR. The other terminal of XOR-gate XOR is coupled to output Q2 of second flip-flop FF2. After expiration of the delay time $T_{XOR}$ of XOR-gate XOR, XOR-gate XOR switches clock signal CLK to high (see FIG. 3).

If the delay time the delay element DEL is zero, the clock signal CLK is equal to signal CIN. Signal CIN is coupled to carry in terminal CIN of full adder FA. Following a further delay time $T_{FA-CO}$, the input to carry output delay of full adder FA, carry output COUT of full adder FA switches to high. Carry output COUT of full adder FA is coupled to clock input C2 of second flip-flop F2. Clock input C2 of second flip-flop FF2 thus follows signal COUT. After expiration of the delay time $T_{FFQ}$, the clock to Q delay time of the second flip-flop which is preferably equal to the clock to Q delay time of first flip-flop FF1, output Q2 of second flip-flop FF2 switches from low to high. Inverted output $\overline{Q2}$ of second flip-flop FF2 is coupled to the data input D2 of second flip-flop FF2. Output Q2 of second flip-flop FF2 is coupled to the second terminal of XOR-gate XOR. Since the value at output Q1 of first flip-flop FF1 is still high, the output of XOR-gate XOR switches from high to low after expiration of delay time $T_{XOR}$. Thus clock signal CLK switches from high to low and a first clock period CLKP has expired (see FIG. 3).

This signal routing is repeated for each clock cycle. At the beginning of a new clock cycle, clock signal CLK is coupled to carry input CIN of full adder FA via delay element DEL. Upon expiration of delay time $T_{FA-S}$ sum output S of full adder FA switches from low to high. The signal routing proceeds as already explained. At the end, clock signal CLK again switches to high.

A clock period CLKP is given by the following formula:

$$CLKP = 2T_{FFQ} + T_{FA-S} + T_{FA-CO} + 2T_{XOR} + 2T_{DELAY}$$

where: $T_{DELAY}$ is the delay time of delay element DEL.

The propagation delay time of the critical path CPOM of a multiplier may be estimated by help of the formula:

$$CPOM = T_{FFQ} + T_{FF-SETUP} + T_{FA-S} + T_{FA-CO}$$

where: $T_{FFQ}$ is the delay time at a flip-flop for a signal that is routed from a clock input to the Q output; $T_{FF-SETUP}$ is the setup time for a flip-flop; $T_{FA-S}$ is the delay time in the full adder for a signal that is routed from the carry input CIN to the sum output S; and $T_{FA-CO}$ is the delay time in a full adder for a signal that is coupled to carry input CIN and is routed to carry output COUT.

For a typical flip-flop, $2T_{FFQ}$ is nearly equal to $T_{FFQ}$ plus $T_{FE-SETUP}$. This is because setup time $T_{FF-SETUP}$ is nearly equal to the clock to Q delay $T_{FFQ}$. The setup time is approximately the clock to Q delay $T_{FFQ}$. Accordingly, the first summand $2T_{FFQ}$ of the formula for CLKP and the sum of the first two delay times $T_{FFQ}$ and $T_{FF-SETUP}$ in the formula for CPOM are nearly equal. Further, the second and third delay time in the formula for CLKP and the third and fourth delay time inside the formula for CPOM ($T_{FA-S}$, $T_{FA-CO}$) are identical. Consequently, the clock period CLKP is greater than the critical path of the multiplier CPOM by the following delay time $T_{SM}$ which is referred to as a safety margin.

$$T_{SM} = 2T_{XOR} + 2T_{DELAY}$$

Consequently, the oscillator 12 giving the clock signal CLK for the registers 4, 6, 8 and 10 of the multiplier 2 according to FIG. 1 is slower than the signal delay time of the critical path of the multiplier 2. The propagation delay of the critical path of the carry save adder CSA is lower or equal to the clock period of the oscillator 12 plus the delay time $T_{SM}$ defining a safety margin. The logical gates of the oscillator 12 and the logical gates of the multiplier 2 are preferably manufactured with the same standard cell or have the same semiconductor layout. Thus the safety margin $T_{SM}$ is preserved even if the PVT parameters change.

Figure 4:
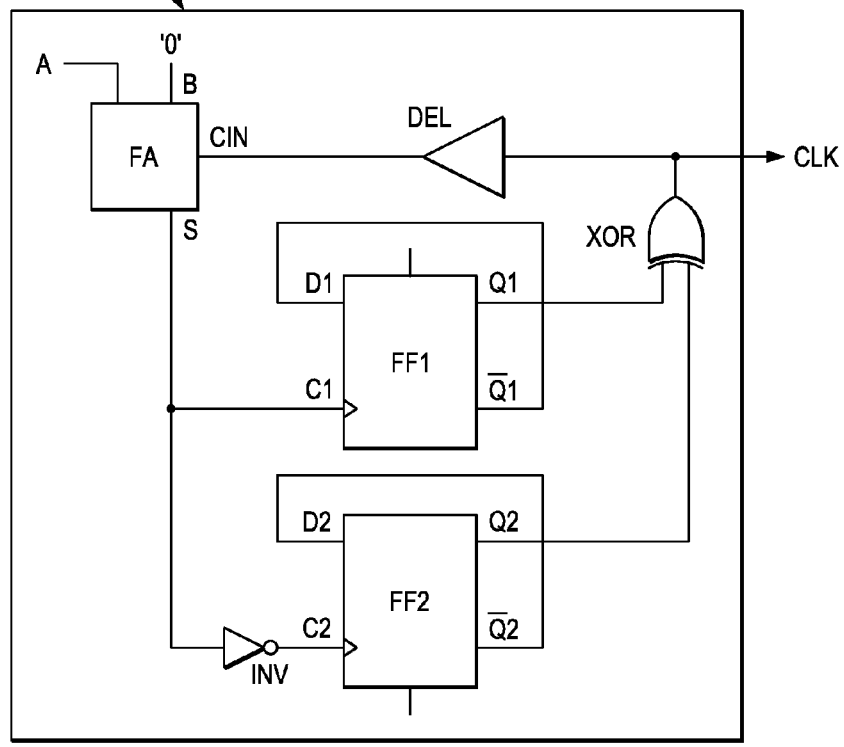
FIGS. 4 and 5 are simplified circuit diagrams of an oscillator of further embodiments of the invention.
Figure 5:
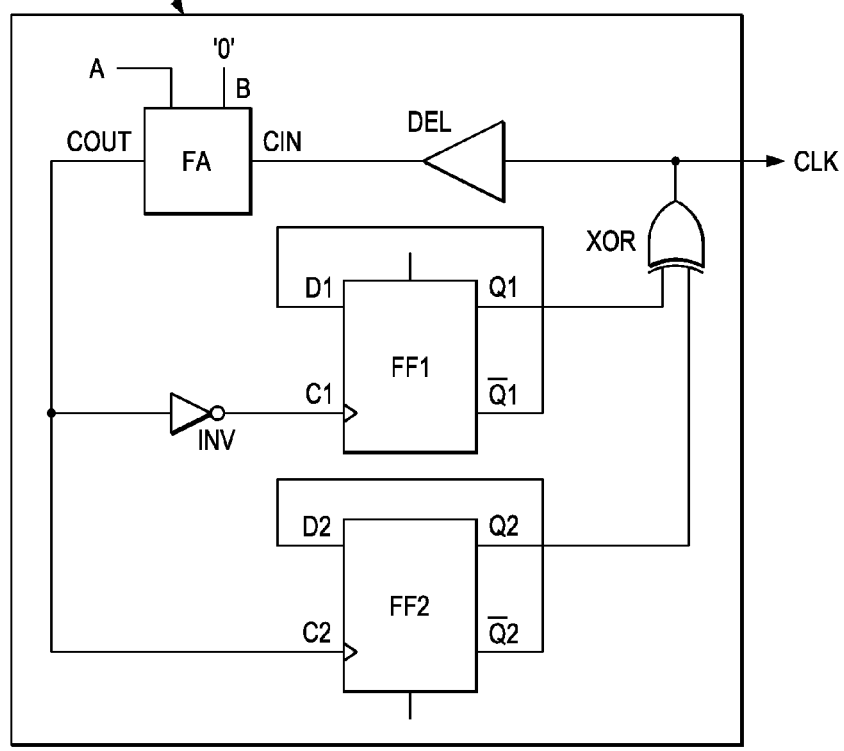

FIGS. 4 and 5 are further embodiments of oscillator 12. In FIG. 4 sum output S of full adder FA supplies the clock inputs of flip-flops FF1 and FF2. In FIG. 5 carry output COUT of full adder FA supplies the clock inputs of flip-flops FF1 and FF2. In both embodiments, one channel is inverted. FIG. 4 illustrates inverter INV coupled to clock input C2 of second flip-flop FF2. FIG. 5 illustrates inverter INV coupled to clock input C1 of first flip-flop FF1. The operation of the embodiments of FIGS. 4 and 5 is very similar.

In FIG. 4, inverter INV inverts the signal sum output S of full adder FA to clock input C2 of second flip-flop FF2. The signal from sum output S of full adder FA to clock input C1 of first flip-flop FF1 is not inverted. Thus just one of flip-flops FF1 and FF2 receives a clock signal. Sum S and carry COUT output of full adder FA are opposite to each other and accordingly only one of the clock inputs of the flip-flops receives a clock signal. Thus if a first clock input is high the other clock input will be low.

The embodiment is advantageous if the delay times between the carry input CIN an the sum output S designated $T_{FA-S}$ and the delay time between the carry input CIN and the carry output COUT of the full adder FA designated $T_{FA-CO}$ are significantly different. A suitable delay time should be selected. The additional inverter INV provides an extra delay time adding a further delay to the clock period.

Figure 6:
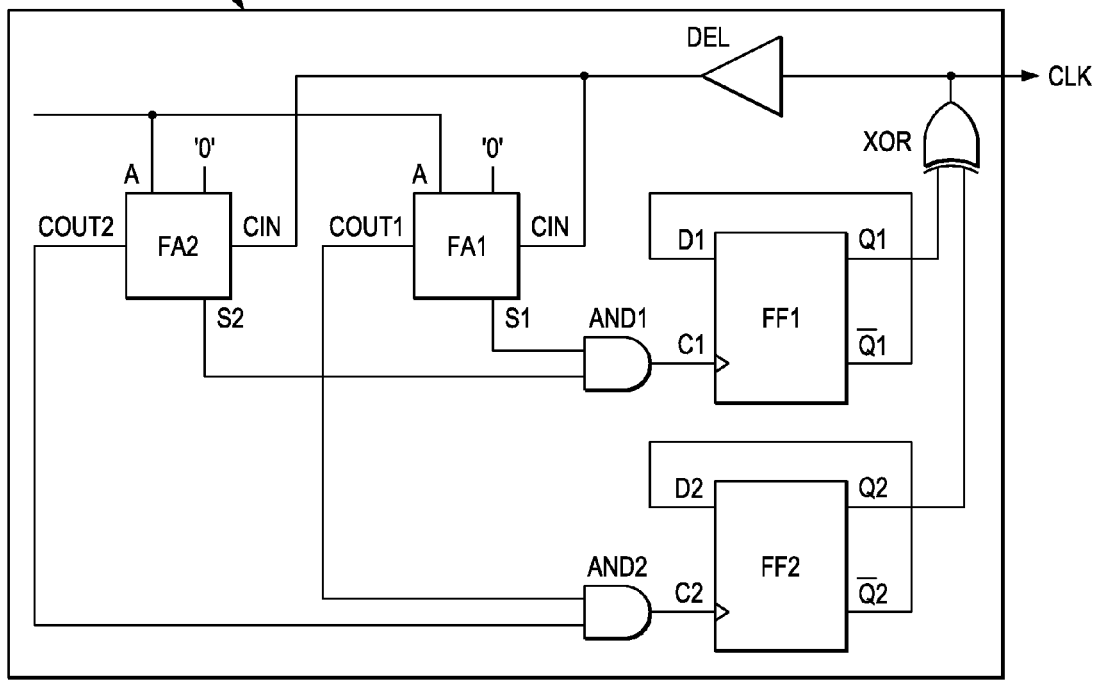
FIG. 6 is a simplified circuit diagram of an oscillator of another embodiment of the invention.

According to a further embodiment shown in FIG. 6, the oscillator 12 has a further full adder this including first full adder FA1 and second full adder FA2. Oscillator 12 further includes a first AND gate AND1 and a second AND gate AND2. As already shown in FIG. 2, data output Q1 of first flip-flop FF1 is coupled to the first terminal of the XOR-gate XOR and data output Q2 of second flip-flop FF2 is coupled to the second terminal of the XOR-gate XOR. Inverted output $\overline{Q1}$ of first flip-flop FF1 is coupled to data input D1 of first flip-flop FF1 and inverted output $\overline{Q2}$ of second flip-flop FF2 is coupled to data input D2 of second flip-flop FF2. The output of the XOR-gate outputs clock signal CLK and is further coupled via the delay element DEL to carry inputs CIN of both first full adder FA1 and second full adder FA2.

Oscillator 12 is enabled by switching input A of first adder FA1 and input A of second full adder FA2 from low to high. Second input B of first full adder FA1 and second full adder FA2 remain at "0", as illustrated in FIG. 2. Sum output S1 of first full adder FA1 is coupled to one terminal of first AND element AND1. Sum output S2 of second full adder FA2 is coupled to the other terminal of first AND element AND1. The output of first AND element AND1 is coupled to clock input C1 of first flip-flop FF1.

Carry output COUT1 of first full adder FA1 is coupled to one terminal of second AND-gate AND2. Carry output COUT2 of second full adder FA2 is coupled to the other terminal of second AND-gate AND2. The output of second AND gate AND2 is coupled to clock input C2 of second flip-flop FF2.

First and second AND-gates AND1 and AND2 are high if both inputs are high. The output of first AND gate AND1 is high if both sum output S1 of first full adder FA1 and sum output S2 of second full adder FA2 are high. The same applies with respect to carry outputs COUT1 and COUT2 of first full adder FA1 and second full adder FA2.

First full adder FA1 and second full adder FA2 work synchronously. If the first full adder FA1 and second full adder FA2 are exactly identical and have the same internal delay times ($T_{FA-S}$, $T_{FA-CO}$), the clock period is the clock period of the embodiment in FIG. 2 with an added delay time due to the AND gates AND1 and AND2. However, if the full-adders FA1 and FA2 having differing delay times, due to production spread or slight variations in the semiconductor production process, clock period CLK is dominated by the slower full-adder. This leads to a further safety margin with respect to the necessity that clock period CLK shall be slower than the critical path of the multiplier.

FIG. 7 is a simplified circuit diagram of a multiplier 2 including a carry save adder CSA, a temporary sum register 4, a temporary result register 6, a temporary carry register 8 and an accumulating result shift register 10. Each register 4, 6, 8, 10 has a plurality of flip-flops FF. Carry save adder CSA has a plurality of full adders FA in four rows for four bits $X_I$, $X_{I+1}$, $X_{I+2}$, and $X_{I+3}$ of a second operand. The first operand has a 4 bit depth with bits ranging from $a_0$ to $a_3$. For operands having a higher bit depth, the operation is repeated iteratively. The operation of the registers 4, 6, 8, 10 is the same mentioned for the multiplier 2 illustrated in FIG. 1.

Figure 8:
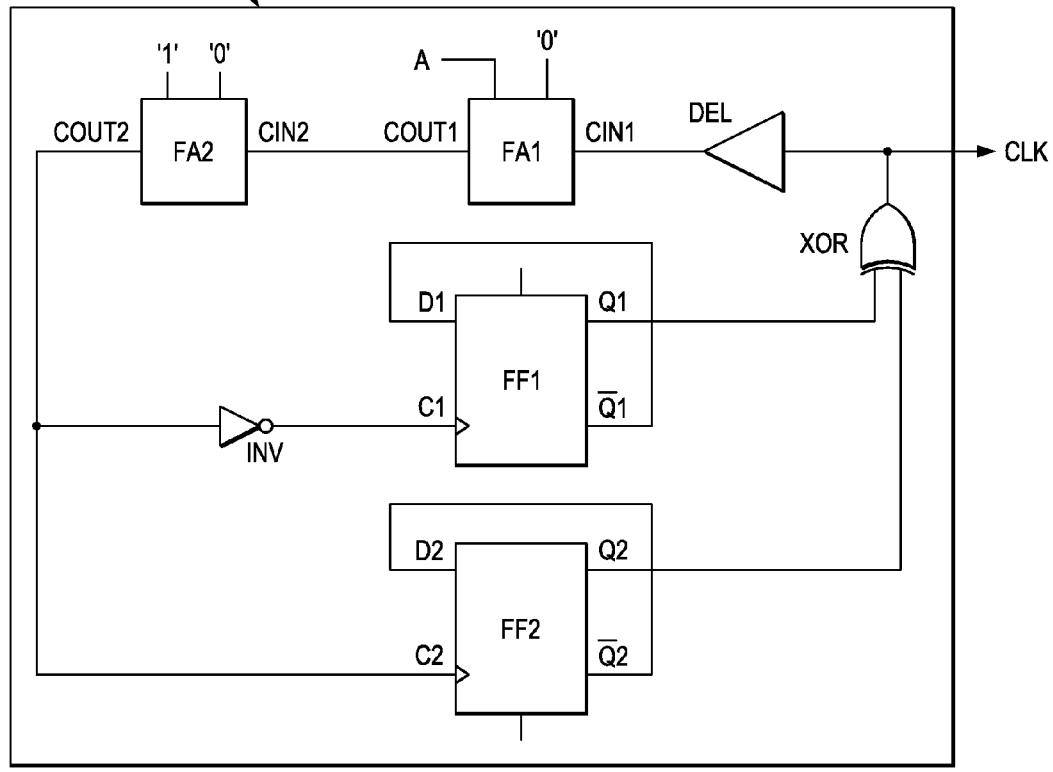
FIG. 8 is a simplified circuit diagram of an oscillator of another embodiment where the oscillator is dedicated to the multiplier as illustrated in FIG. 7.

FIG. 8 is further embodiment of an oscillator 12 corresponding to the embodiment of FIG. 4 including two full adders FA1 and FA2. Carry output COUT of first full adder FF1 is coupled to carry input CIN of second full adder FA2.

The clock period CLKP for the oscillator according to FIG. 8 is given by the following formula:

$$CLKP = 2T_{FFQ} + 4T_{FA-CO} + 2T_{XOR} + 2T_{DELAY}$$

This includes an extra time of $2T_{FA-CO}$ in comparison to the embodiment of FIG. 2. This extra time may be necessary since the critical path CPOM of a multiplier having four rows may be estimated by the formula:

$$CPOM = T_{FFQ} + T_{FF-SETUP} 4T_{FA-CO}$$

Assume the delay time for a signal from the carry input to the sum output $T_{FA-S}$ of a full adder is comparable to the delay time of a signal from the carry input CIN to the sum output S $T_{FA-CO}$ in a full adder. This includes an extra time of $2 T_{FA-CO}$ compared to the embodiment of FIG. 2. Thus the safety margin between the clock of the oscillator and the carry save adder remains constant at:

$$T_{SM} = 2T_{XOR} + 2T_{DELAY}$$

This principle permits the design of a suitable oscillator for a multiply unit having a carry save adder with an arbitrary number of rows. The number of rows of the multiply may be twice as high as the number of full adders.

Figure 9:
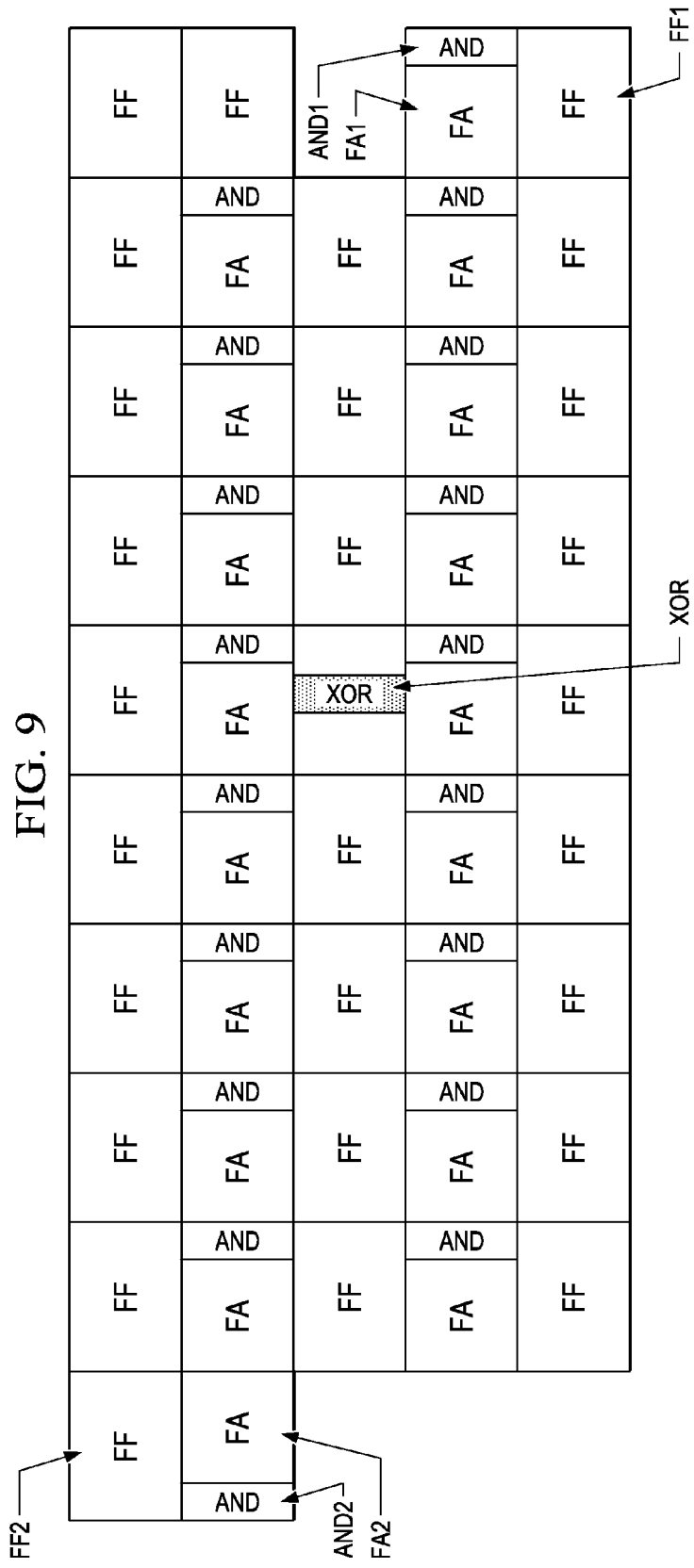
FIG. 9 is a simplified floor plan for a carry save adder and oscillator of an embodiment of the invention.

FIG. 9 is a simplified floor plan for a carry save adder and an oscillator. The oscillator has first and second flip-flops FF1 and FF2, first and second full adders FA1 and FA2, first and second AND gates AND1 and AND2 and XOR-gate XOR. As an example according to FIG. 6 the oscillator may have no delay element DEL. Further flip-flops FF, full adders FA and AND gates AND are component parts of the carry save adder.

This embodiment permits the signal routing delay times inside the oscillator and inside the carry save adder to be matched. To switch clock signal CLK (see also FIG. 6) the signal from data output Q1 of first flip flop FF1 must be routed to one input of XOR-gate XOR. The same applies for signal routing between data output Q2 of second flip flop FF2 and the other input of XOR-gate XOR.

By placing the two flip-flops FF1 and FF2 in the periphery of the carry save adder, the critical path of the oscillator including the signal routing delay times is longer than the delay time of the critical path in the carry save adder. The wiring length and therefore the signal delay due to signal propagation in the oscillator is always at least slightly greater than the maximum routing delay time of the multiply unit.

XOR-gate XOR is disposed in a center area that is more or less in the middle between the two flip-flops FF1 and FF2. This provides a uniform duty cycle of the oscillator. In the floor plan of FIG. 9, the length of the conductive path between data output Q1 of first flip flop FF1 and the input of XOR-gate XOR is more or less the same as the length of the conductive path between data output Q2 of second flip flop FF2 and the other input of XOR-gate XOR. The signal routing delay time will be comparable for the two conductive paths.

During a first part of the clock cycle of the oscillator, if the output signal of the oscillator is "high", the clock signal is routed from first flip-flop FF1 to XOR-gate XOR. During a second part of the clock cycle of the oscillator, if the output signal is "low", the clock signal is routed from the second flip-flop FF2 to the XOR-gate XOR. Due to the arrangement of the XOR-gate in a center region of the carry save adder, the signal path delay for the clock signal that is routed from first flip-flop FF1 to XOR-gate XOR is comparable to the signal path delay for the clock signal that is routed from second flip-flop FF2 to XOR-gate XOR. Accordingly, the duty cycle of the clock signal is advantageously uniform.

Figure 10:
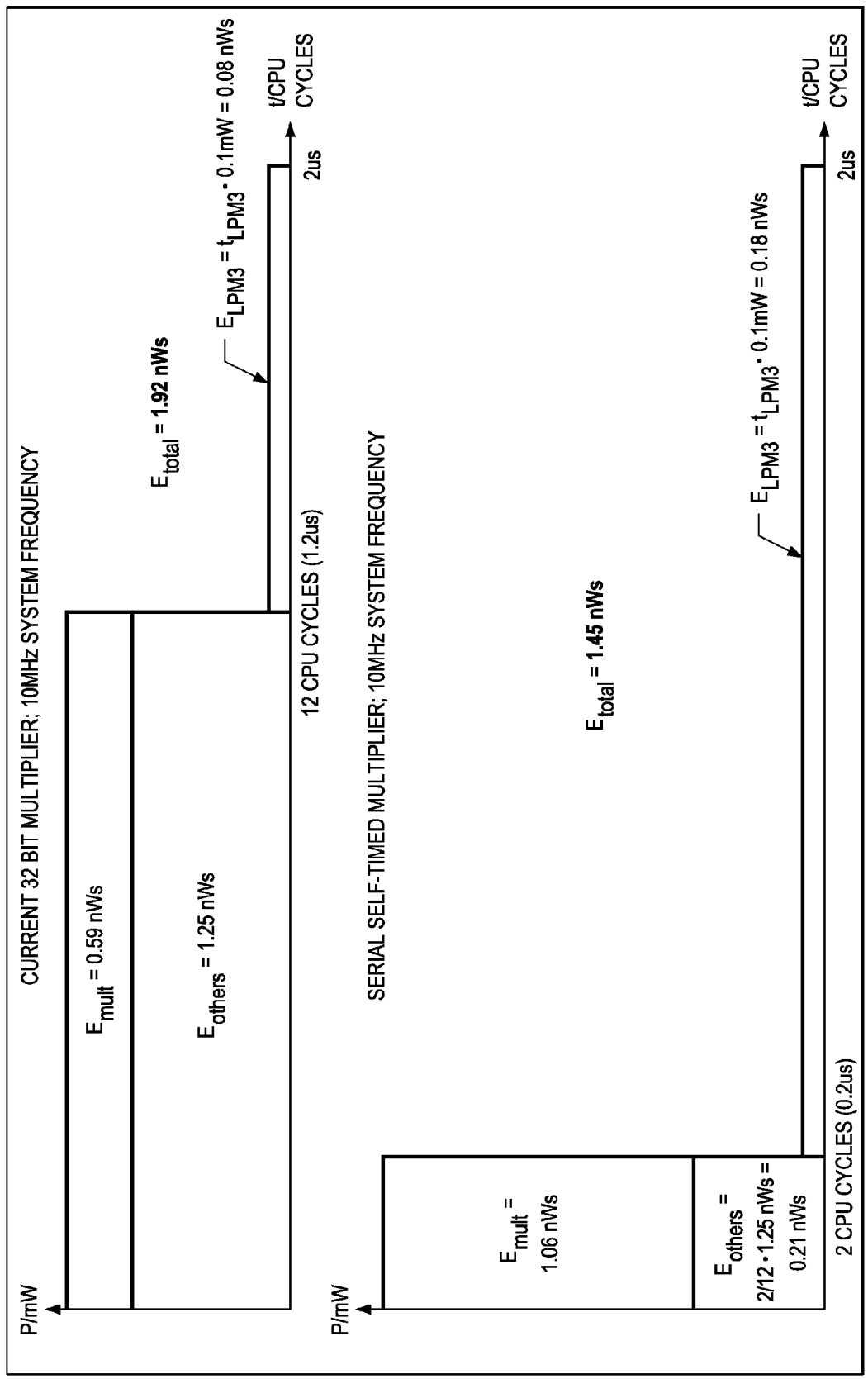
FIGS. 10 and 11 are schematic diagrams of power estimations for a multiplier of an embodiment of the invention.
Figure 11:
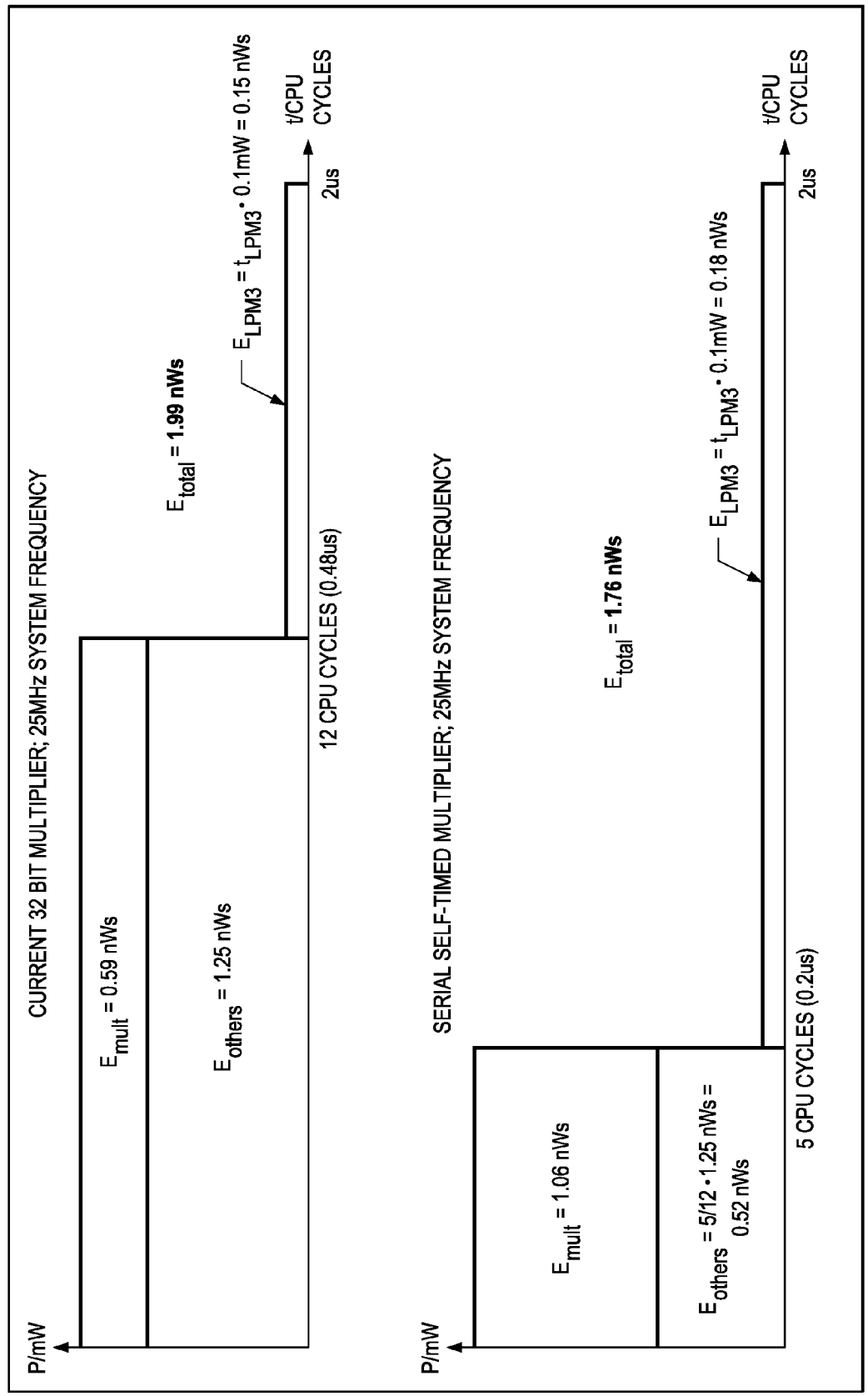

FIGS. 10 and 11 are exemplarily simulations of the energy consumption of a 32 bit multiplier according to the prior art and in comparison a 32 bit multiplier according to an embodiment of this invention. The potential for energy savings is visualized. The graphs show the power consumption in mW over time in µs. The respective areas illustrate the energy consumption.

In the upper part of FIG. 10 shows the energy consumption of a multiplier according to the prior art. In comparison, the lower part of FIG. 10 illustrates the energy consumption of a multiplier according to an embodiment of this invention. As an example FIG. 10 assumes a system frequency of 10 MHz. FIG. 11 is a further example comparing the energy consumption of multiplier according to the prior art with a multiplier according to an embodiment of the invention. FIG. 11 assumes a system frequency of 25 MHz. The upper part of FIG. 11 shows the energy consumption of a multiplier according to the prior art, while the lower part of FIG. 11 illustrates the energy consumption of a multiplier according to an embodiment of this invention.

At a system speed of 10 MHz, the multiplier according to the prior art consumes 12 CPU cycles having a duration of 1.2 µs for the exemplary multiplication operation. The multiplier itself consumes 0.59 nWs during this operation. Further parts of the system consume 1.25 nWs. After the calculation, a quiescent energy consumption of 0.08 nWs is consumed until the end of 2 µs. This leads to a total energy consumption of 1.92 nWs.

In contrast, a multiplier according to an embodiment of the invention consumes 1.06 nWs for the exemplary multiplication operation. This specific energy consumption is higher than for the multiplier according to the prior art. However, the multiplication operation is finished after 2 CPU cycles. The power consumption of the further parts of the system is accordingly only 2/12 of the aforementioned 1.25 nWs which is about 0.21 nWs. After the calculation, a quiescent energy consumption of 0.18 nWs is consumed until the end of 2 µs. This leads to a total energy consumption of 1.45 nWs. This is a total energy savings of about 24.5%. The multiplier according to an embodiment of this invention needs about 24.5% less energy for the same exemplary calculation operation in comparison to an multiplier according to the prior art.

FIG. 11 illustrates the exemplary calculation at a system speed of 25 MHz. FIG. 11 shows a total power savings of about 11.6%. A 32 bit multiplier according to the prior art consumes about 1.99 nWs during 2 μs. Since the overall system frequency is higher, the multiplier according to an embodiment of this invention requires 5 CPU cycles instead of 2 CPU cycles at a system frequency of 10 MHz. This leads to an energy consumption of 1.06 nWs for the multiplier and 0.52 nWs for the further part of the system. The energy consumption of the further parts of the system is significantly reduced because this embodiment of the invention requires 5 CPU cycles instead of 12 CPU cycles required by the multiplier of the prior art. The total energy consumption of the multiply operation according to this embodiment of the invention is 1.76 nWs during 2 μs.

Figure 12:
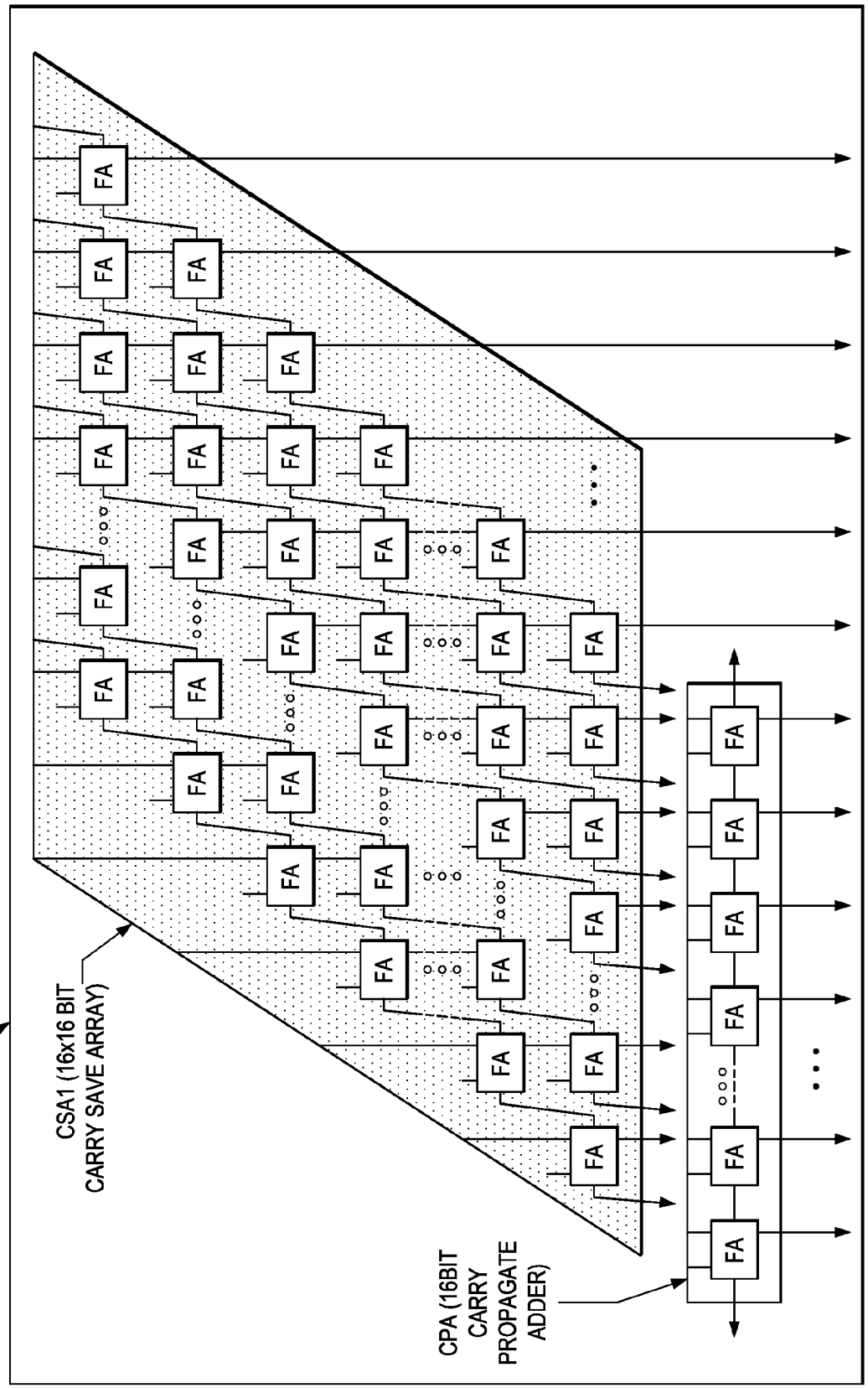
FIG. 12 is a simplified diagram of a multiplier with a carry save adder and a carry propagate adder.

FIG. 12 shows a simplified diagram of a multiplier with two adder stages. This is a typical configuration of a multiplier 2. The first stage is a carry save adder CSA1 in accordance with the previously discussed embodiments of the invention. The second stage is a carry propagate stage CPA configured to sum the final temporary sum vector and the final temporary carry vector provided in registers 4 and 8 by carry save adder CSA1. Since carry propagate adder CPA has an entirely different architecture than carry save adder CSA1, the optimized clocking principles and oscillators shown FIGS. 2, 4, 5, 6 and 8 according to the invention cannot be applied. The final summing performed in carry propagate adder CPA requires a different clock period. This disadvantage can be overcome if carry save adder CSA1 is used for the last summing instead of carry propagate adder CPA.

Figure 13:
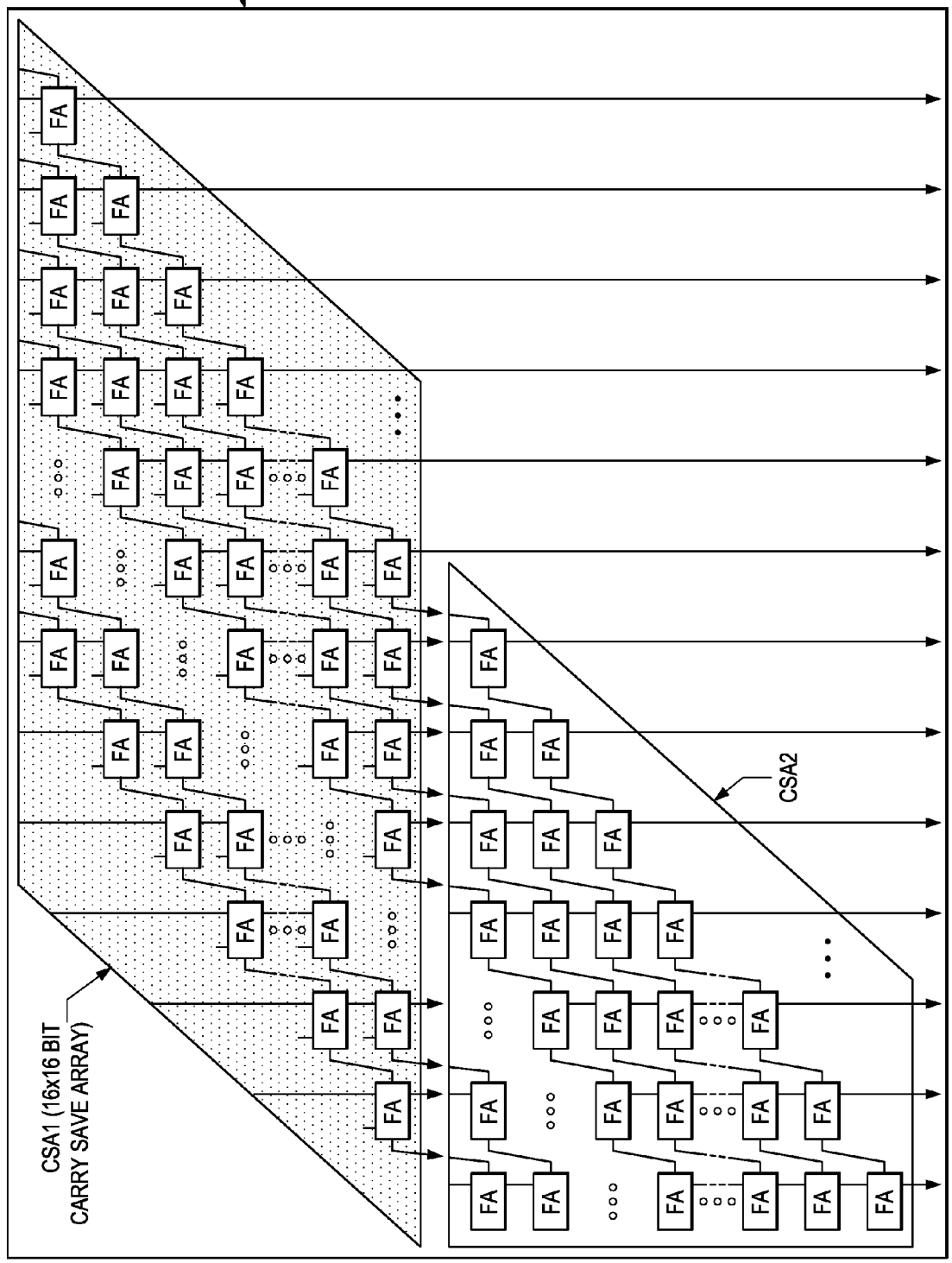
FIG. 13 is a simplified diagram of a multiplier with two carry save adder stages.

FIG. 13 illustrates how a carry save adder used for the normal operation can be reused for the final summing. FIG. 13 shows two carry save adder stages CSA1 and CSA2. Carry save adder stage CSA2 is only illustrated to show the way in which carry save adder stage CSA1 is be modified to perform the final summing step. The same hardware is used for carry save adder stage CSA1 and CSA2. F carry save adder stage CSA1 has the carry save adder configuration described with respect to the other embodiments of the invention. An optimized oscillator according to the aspects of the invention can be used. The second carry save adder stage CSA2 sums the last temporary sum vector and the last temporary carry vector. The hardware for both configurations CSA1 and CSA2 is the same. It is a 16 by 16 bit carry save array. Since the same hardware is used for both operations, the critical paths are identical. The maximum propagation delays of the two carry save adder configurations CSA1 and CSA2 are therefore exactly equal. This means that the same optimized clock period can be used.

Figure 14:
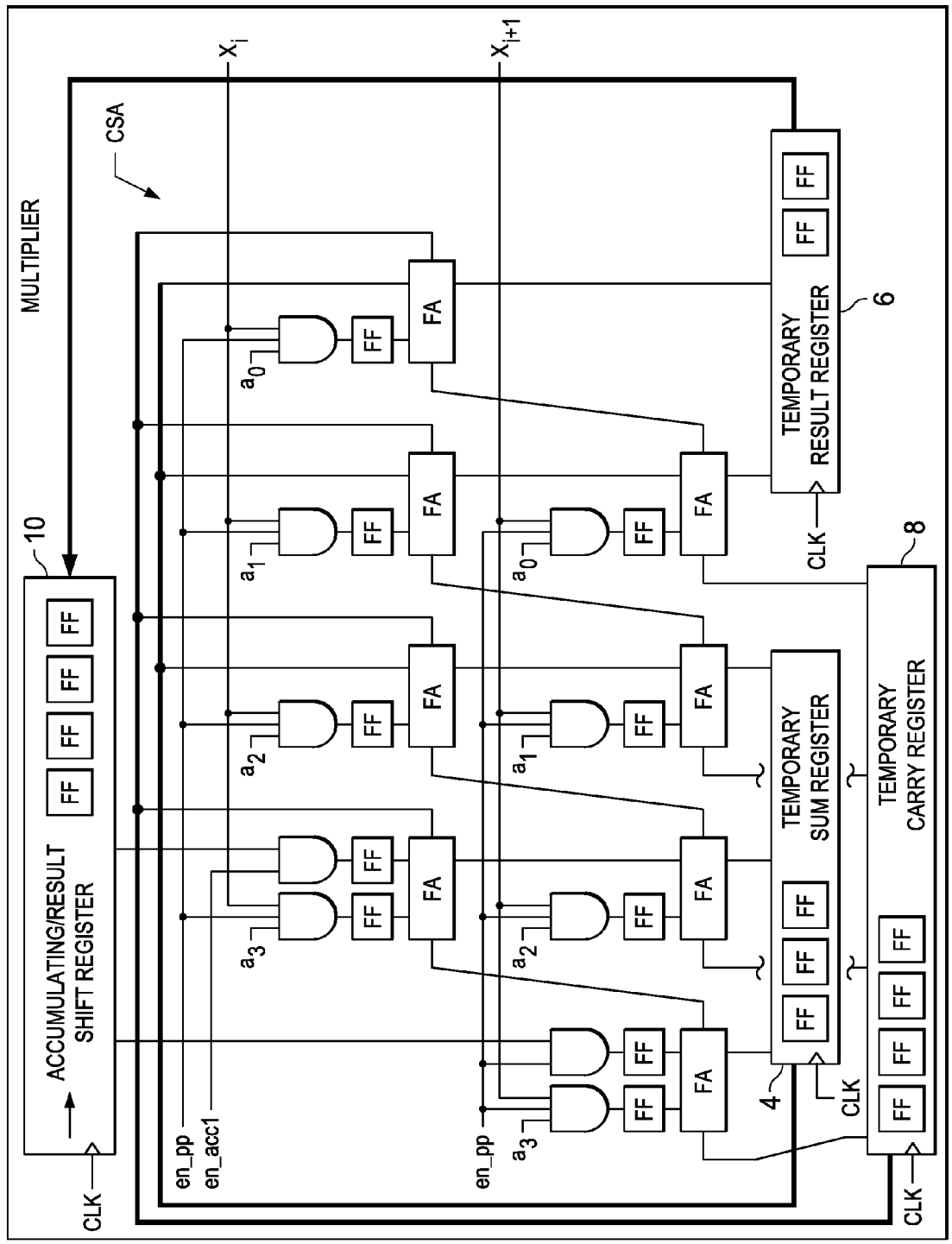
FIG. 14 is the multiplier of FIG. 1 modified according to another embodiment of the invention.

FIG. 14 shows a simplified circuit diagram of modification of the multiplier shown in FIG. 1. The modifications reuse the same carry save array for all summing steps as illustrated in FIG. 13. There is an additional AND gate coupled to each full adder for the highest bit of each row. The other AND gates of each row have an additional input for a partial product enable signal en_pp. This signal is high during normal operation while the partial products are calculated. The oscillator and optimal clock period according to this invention is used for each cycle. There is an additional enable signal referred to as accumulator enable signal en_acc. This signal is always active when en_pp is active and additionally during the first cycle during which the final product (illustrated by CSA2 in FIG. 13) is formed. Signals en_acc and en_pp allow adding the two highest significant bits of the value held in accumulating result shift register 10. The lower significant bits other than two highest significant bits of the accumulating result shift register 10 are loaded into the temporary sum register 4 before the carry save adder operation starts. This principle is applied to other embodiments using carry save adders with a different number of rows and columns.

The carry save array shown in FIG. 14 can be used for all summing operations required for determining the product of two operands and it allows to add a third operand from the accumulation register. Since the same hardware is used for all operations, the critical path is the same and the same optimized clock signal generated by the oscillators according to the invention can be used.

In order to ensure the critical path as defined herein above, there are flip-flops FF added between the outputs of the AND gates and the inputs of the full adder cells FA. The flip-flops allow the partial products in the AND gates to be determined one cycle before the summing in the full adders FA is performed. This ensures that the critical path becomes independent of the partial product generation and corresponds always to a path comprising a flip-flop FF, a full adder FA another full adder FA and another flip-flip FF. This also applies to the AND gates used for gating the accumulator signals with enable signal en_acc and with partial product enable signal en_pp.

The same modifications as shown in FIG. 14 with respect to FIG. 1 can be made for the embodiment shown in FIG. 7.

Although the invention has been described hereinabove with reference to specific embodiments, it is not limited to these embodiments and no doubt further alternatives will occur to the skilled person that lie within the scope of the invention as claimed.

What is claimed is:

1. An independently timed multiplier unit comprising:
   a multiplier including a first set of semiconductor circuits in a critical path, said first set of semiconductor circuits having a first propagation delay, and a clock input receiving a clock signal to control said first set of semiconductor circuits of said critical path; and
   a clock generator supplying a clock signal to said clock input of said multiplier, said clock generator having a second set of semiconductor circuits configured to control a clock period of said clock generator by a second propagation delay through said second set of semiconductor circuits, said second set of semiconductor circuits comprising circuits corresponding to said first set of semiconductor circuits experiencing the same variation in said second propagation delay as variation in said first propagation delay due to variations in production process, voltage and temperature to set said clock period longer than a propagation delay through said first set of semiconductor circuits of said critical path of said multiplier.

2. The independently timed multiplier unit of claim 1, wherein:
   said first set of semiconductor circuits of said multiplier comprises
      a plurality of rows equal in number to a number of bits of a first multiply operand disposed in a chain from a least significant bit row to a most significant bit row, each row having
         a plurality of AND gates equal in number to a number of bits of a second multiply operand, each AND gate having a first input receiving a bit of said first operand corresponding to said row, a second input receiving a corresponding bit of said second operand and an output, a plurality of full adder circuits equal in number to said number of bits of said second multiply operand disposed in a chain from a least significant bit full adder to a most significant bit full adder, each full adder having a first input connected to said output of a corresponding AND gate, a second input, a carry input, a carry output and a sum output, said second input connected to said sum output of said full adder of a next most significant bit of a previous row, said carry input connected to said carry output of a corresponding full adder of a prior row, said carry output connected to said carry input of a corresponding full adder of a following row, a temporary result register having inputs connected to said sum output of a least significant bit full adder of each row separately storing said sum outputs, a temporary sum register having inputs connected to said sum outputs of all but said least significant bit full adder of a most significant bit row separately storing said sum outputs, a temporary carry register having inputs connected to said carry output of all full adders of said most significant bit row separately storing said carry outputs, and an accumulating result shift register connected to said temporary result register having outputs connected to said second input of said most significant bit full adder of each row, said accumulating result shift register connected to said temporary result register for accumulating and shifting data from said temporary result register and supplying said outputs of said least significant bit full adder of each row of a prior iteration of said multiplier to said second inputs of said most significant bit full adder of each row, said temporary sum register connected to said second inputs of each full adder of said least significant bit row except said most significant bit full adder for supplying said separately stored sum output of a prior iteration of said multiplier to said second inputs of each full adder of said least significant bit row except said most significant bit full adder, a temporary carry connected to said carry inputs of each full adder of said least significant bit row for supplying said separately stored carry outputs of a prior iteration of said multiplier to said carry inputs of each full adder of said least significant bit row.

3. The independently timed multiplier circuit of claim 2, wherein:

said number of rows of said multiplier is two;

said clock generator comprises:

a full adder having a first input receiving an activation signal corresponding to 0 when the clock generator is inactivated and 1 when the clock generator is activated, a second input receiving a 0 input signal, a carry input receiving said clock signal, a carry output and a sum output, a first flip-flop having a clock input connected to said sum output of said full adder, a data input, a non-inverting output and an inverting output connected to said data input, a second flip-flop having a clock input connected to said carry output of said full adder, a data input, a non-inverting output and an inverting output connected to said data input, and an exclusive OR gate having a first input connected to said non-inverting output of said first flip-flop, a second input connected to said non-inverting output of said second flip-flop and an output connected to said carry input of said full adder and generating said clock signal.

4. The independently timed multiplier circuit of claim 3, wherein:

said clock generator further comprises a delay element having an input connected to said output of said exclusive OR gate, an output connected to said carry input of said full adder and a delay selected to set said clock period longer than a propagation delay through said first set of semiconductor circuits of said critical path of said multiplier.

5. The independently timed multiplier circuit of claim 2, wherein:

said number of rows of said multiplier is two;

said clock generator comprises:

a full adder having a first input receiving an activation signal corresponding to 0 when the clock generator is inactivated and 1 when the clock generator is activated, a second input receiving a 0 input signal, a carry input receiving said clock signal and a sum output, a first flip-flop having a clock input connected to said sum output of said full adder, a data input, a non-inverting output and an inverting output connected to said data input, an inverting having an input connected to said sum output of said full adder and an output, a second flip-flop having a clock input connected to said output of said inverter, a data input, a non-inverting output and an inverting output connected to said data input, and an exclusive OR gate having a first input connected to said non-inverting output of said first flip-flop, a second input connected to said non-inverting output of said second flip-flop and an output connected to said carry input of said full adder and generating said clock signal.

6. The independently timed multiplier circuit of claim 5, wherein:

said clock generator further comprises a delay element having an input connected to said output of said exclusive OR gate, an output connected to said carry input of said full adder and a delay selected to set said clock period longer than a propagation delay through said first set of semiconductor circuits of said critical path of said multiplier.

7. The independently timed multiplier circuit of claim 2, wherein:

said number of rows of said multiplier is two;

said clock generator comprises:

a full adder having a first input receiving an activation signal corresponding to 0 when the clock generator is inactivated and 1 when the clock generator is activated, a second input receiving a 0 input signal, a carry input receiving said clock signal and a carry output, an inverter having an input connected to said carry output of said full adder and an output, a first flip-flop having a clock input connected to said output of said inverter, a data input, a non-inverting output and an inverting output connected to said data input, a second flip-flop having a clock input connected to said carry output of said full adder, a data input, a non-inverting output and an inverting output connected to said data input, and an exclusive OR gate having a first input connected to said non-inverting output of said first flip-flop, a second input connected to said non-inverting output of said second flip-flop and an output connected to said carry input of said full adder and generating said clock signal.

8. The independently timed multiplier circuit of claim 7, wherein:
said clock generator further comprises a delay element having an input connected to said output of said exclusive OR gate, an output connected to said carry input of said full adder and a delay selected to set said clock period longer than a propagation delay through said first set of semiconductor circuits of said critical path of said multiplier.

9. The independently timed multiplier circuit of claim 2, wherein:
said number of rows of said multiplier is two;
said clock generator comprises:
a first full adder having a first input receiving an activation signal corresponding to 0 when the clock generator is inactivated and 1 when the clock generator is activated, a second input receiving a 0 input signal, a carry input receiving said clock signal, a carry output and a sum output,
a second full adder having a first input receiving said activation signal, a second input receiving a 0 input signal, a carry input receiving said clock signal, a carry output and a sum output,
a first AND gate having a first input connected to said sum output of said first full adder, a second input connected to said sum output of said second full adder and an output,
a first flip-flop having a clock input connected to said output of said first AND gate, a data input, a non-inverting output and an inverting output connected to said data input,
a second AND gate having a first input connected to said carry output of said first full adder, a second input connected to said carry output of said second full adder and an output,
a second flip-flop having a clock input connected to said output of said second AND gate, a data input, a non-inverting output and an inverting output connected to said data input, and
an exclusive OR gate having a first input connected to said non-inverting output of said first flip-flop, a second input connected to said non-inverting output of said second flip-flop and an output connected to said carry input of said full adder and generating said clock signal.

10. The independently timed multiplier circuit of claim 9, wherein:
said clock generator further comprises a delay element having an input connected to said output of said exclusive OR gate, an output connected to said carry input of said full adder and a delay selected to set said clock period longer than a propagation delay through said first set of semiconductor circuits of said critical path of said multiplier.

11. The independently timed multiplier circuit of claim 2, wherein:
said clock generator comprises:
a plurality of full adders equal in number to half a number of said rows of said multiplier disposed in a chain from a first full adder to a last full adder, said first full adder having a first input receiving an activation signal corresponding to 0 when the clock generator is inactivated and when the clock generator is activated, a second input receiving a 0 input signal, a carry input receiving said clock signal and a carry output, each of said full adders following said first full adder having a first input receiving a 1 input signal, a second input receiving a 0 input signal, a carry input connected to said a carry output of an immediately prior full adder and a carry output,
an inverter having an input connected to said carry output of said last full adder and an output,
a first flip-flop having a clock input connected to said output of said inverter, a data input, a non-inverting output and an inverting output connected to said data input,
a second flip-flop having a clock input connected to said carry output of said last full adder, a data input, a non-inverting output and an inverting output connected to said data input, and
an exclusive OR gate having a first input connected to said non-inverting output of said first flip-flop, a second input connected to said non-inverting output of said second flip-flop and an output connected to said carry input of said full adder and generating said clock signal.

12. The independently timed multiplier circuit of claim 11, wherein:
said clock generator further comprises a delay element having an input connected to said output of said exclusive OR gate, an output connected to said carry input of said full adder and a delay selected to set said clock period longer than a propagation delay through said first set of semiconductor circuits of said critical path of said multiplier.

13. The independently timed multiplier of claim 1, wherein:
said first set of semiconductor circuits of said multiplier includes an adder cell; and
said circuits corresponding to said first semiconductor circuits of said second set of semiconductor circuits comprises an adder having an identical logical design to said adder of said multiplier.

14. The independently timed multiplier of claim 13, wherein:
said adder of said multiplier and said adder of said clock generator are manufactured using the same standard cell.

15. The independently timed multiplier of claim 13, wherein:
said adder of said multiplier and said adder of said clock generator are manufactured using the same semiconductor layout.

16. The independently timed multiplier of claim 1, wherein:
said first set of semiconductor circuits of said multiplier includes a register having at least one flip-flop; and
said circuits corresponding to said first semiconductor circuits of said second set of semiconductor circuits comprises a flip-flop having an identical logical design to said flip-flop of said multiplier.

17. The independently timed multiplier of claim 16, wherein:
said flip-flop of said multiplier and said flip-flop of said clock generator are manufactured using the same standard cell.

18. The independently timed multiplier of claim 16, wherein:

said flip-flop of said multiplier and said flip-flop of said clock generator are manufactured using the same semiconductor layout.

19. The independently timed multiplier of claim 1, wherein:
   said first set of semiconductor circuits of said multiplier are disposed in a first floor plan; and
   said circuits corresponding to said first set of semiconductor circuits of said second set of semiconductor circuits of said clock generator are disposed in a second floor plan identical to said first floor plan.

20. The independently timed multiplier unit of claim 1, wherein:
   said first set of semiconductor circuits and said circuits corresponding to said first semiconductor circuits of said second set of semiconductor circuits have identical logic design.

21. The independently timed multiplier unit of claim 1, wherein:
   said first set of semiconductor circuits and said circuits corresponding to said first semiconductor circuits of said second set of semiconductor circuits use the same standard cell.

22. The independently timed multiplier unit of claim 1, wherein:
   said first set of semiconductor circuits and said circuits corresponding to said first semiconductor circuits of said second set of semiconductor circuits have the same semiconductor layout.

23. The independently timed multiplier unit of claim 1, wherein:
   said first set of semiconductor circuits and said circuits corresponding to said first semiconductor circuits of said second set of semiconductor circuits have the same floor plan.

24. An independently timed method of operating a multiplier comprising the steps of:
   determining a first set of semiconductor circuits forming a critical path in a multiplier, said first set of semiconductor circuits having a first propagation delay;
   constructing a clock generator having a second set of semiconductor circuits configured to control a clock period by a second propagation delay through said second set of semiconductor circuits, said second set of semiconductor circuits comprising circuits corresponding to said first semiconductor circuits experiencing the same variation in said second propagation delay as variation in said first propagation delay due to variations in production process, voltage and temperature, said clock period selected to be longer than said first propagation delay through said first set of semiconductor circuits of said critical path of said multiplier; and
   operating the multiplier using the clock signal of the clock generator.

25. The independently timed method of operating a multiplier of claim 24, wherein:
   said step of constructing a clock generator includes a delay circuit having a delay selected to set said clock period longer than a propagation delay through said first set of semiconductor circuits of said critical path of said multiplier.

26. The independently timed operation of a multiplier of claim 24, wherein:
   said step of constructing a clock generator wherein said circuits corresponding to said first set of semiconductor circuits are manufactured using same standard cell as semiconductor circuits of said first set of semiconductor circuits.

27. The independently timed operation of a multiplier of claim 24, wherein:
   said step of constructing a clock generator wherein said circuits corresponding to said first set of semiconductor circuits are manufactured using same standard logic design as semiconductor circuits of said first set of semiconductor circuits.

28. The independently timed operation of a multiplier of claim 24, wherein:
   said step of constructing a clock generator wherein said circuits corresponding to said first set of semiconductor circuits are manufactured using same floor plan as semiconductor circuits of said first set of semiconductor circuits.

* * * * *